INVENTOR
JOHN PRESPER ECKERT, JR.

BY William Gobman

AGENT

Sept. 10, 1957 J. P. ECKERT, JR 2,806,152

BISTABLE DEVICE

Filed Jan. 21, 1955 2 Sheets-Sheet 2

INVENTOR

JOHN PRESPER ECKERT, JR.

BY William Grobman

AGENT 2,806,152

BISTABLE DEVICE

John Presper Eckert, Jr., Philadelphia, Pa., assignor to Sperry Rand Corporation, New York, N. Y., a corporation of Delaware Application January 21, 1955, Serial No. 483,408

14 Claims. (Cl. 307—88)

The present invention relates to bistable devices and in particular to single core flip-flops with inductive delay.

As is well known, one of the basic components used in computing techniques is the bistable device. Such devices may be used as counters, whereby successive input pulses on a single input line will cause the device to regularly change from one stable state of operation to another.

In the past, such bistable devices have normally been constructed in the form of vacuum tube circuitry, and while such circuitry is usually acceptable, it does have several disadvantages. First, the use of vacuum tubes results in a circuit unit which is relatively large in size, thereby making disposition of components within an over-all installation rather difficult. Second, vacuum tubes are subject to breakage and as a result circuits utilizing such vacuum tubes are often relatively fragile. Again, in the normal course of operation, vacuum tubes are subject to normal operating failures, thus raising serious questions of maintenance and the cost attendant thereto.

Where, as here, reliability of operation is a factor of prime importance, vacuum tubes, even though acceptable for most present-day electronic applications, are faced with accuracy requirements of an entirely different order of magnitude. Magnetic amplifiers of the type here described meet the necessary requirements of reliability of performance for the combinations discussed.

In order to reduce failures due to the foregoing difficulties, other forms of electrical devices have been suggested for use in bistable circuits. One such other form is the magnetic amplifier and it is with this particular type of bistable device that the present invention is primarily concerned.

It is accordingly a prime object of the present invention to provide a novel bistable device utilizing magnetic amplifiers as the basic components thereof.

A further object of the present invention resides in the provision of a bistable device which is both inexpensive to construct and which exhibits considerable ruggedness.

A further object of the present invention is the provision of a bistable device which can be made in relatively small sizes.

It is a principal object of the invention to provide a single magnetic amplifier bistable device in combination with a storage inductor, whereby the inductive reaction of the said inductor may be utilized to provide a control signal for the said amplifier thereby to eliminate the need of other amplifiers in the circuit.

It is an object of the invention to provide a bistable device having an inductor as a delay element thereof whereby a signal may be applied to one end of the inductor while the other end thereof is effectively grounded so that a subsequent inductive "kick" or polarity reversal of the inductor may be utilized to provide a positive delayed pulse output from the end of the inductor which was effectively grounded while the end of the inductor to which the amplifier output is applied is also grounded through an output diode and a sneak suppressor diode.

It is an object of the invention to provide a magnetic amplifier bistable device having a simple circuit comprising both inductive delay and sneak suppression.

Non-complementing amplifiers and their operation are disclosed in detail in the patent to Steagall 2,709,798. Further, the book "High-Speed Computing Devices" by Thompkins, Wakelin and Stiffler, published by McGraw-Hill Book Company, Inc., 1950, will be found to describe uses to which one may put the invention. Reference is made to these sources for a supplemental discussion of magnetic amplifiers.

The foregoing patent has been assigned to the assignee of the instant application, and it is to be understood that the present invention may utilize the forms of amplifiers disclosed in the said patent as well as the particular forms to be described. Other variations will readily suggest themselves to those skilled in the art.

As will be described, the amplifiers employed in the bistable devices of my invention are energized by "power pulses." These pulses are preferably in the form of regularly occurring positive and negative going square waves although other alternating configurations, such as sine waves, may be employed. In the disposition of components, some amplifiers will be fed by "phase 1 power pulses" and this term merely refers to such positive and negative going pulses as timed with respect to an arbitrary datum. Other of the amplifiers will utilize "phase 2 power pulses" and it is to be understood that this latter term again refers to pulses of the same form as the phase 1 pulses with the sole exception that a positive going portion of a phase 1 pulse occurs during a negative going portion of a phase 2 pulse and vice versa. Again, it will become apparent from the following description that the several power pulses cooperate with input pulses to selectively produce or inhibit an output from the amplifier. These input pulses must ordinarily occur during a negative going portion of the power pulse with which it is to cooperate; and in this respect therefore when I speak of a "phase 1 input pulse" it is to be understood that this term refers to an input pulse occurring during a negative going portion of a phase 1 power pulse, or in brief an input pulse which may effectively cooperate with a phase 1 power pulse. Similarly, a "phase 2 input pulse" is one which occurs during a negative going portion of a phase 2 power pulse, as will become apparent from the following description. A phase 1 input pulse cannot cooperate with a phase 2 power pulse, nor can a phase 2 input pulse cooperate with a phase 1 power pulse.

The foregoing objects, advantages and operation will become more readily apparent from the following description and accompanying drawings, in which.

Figure 1:
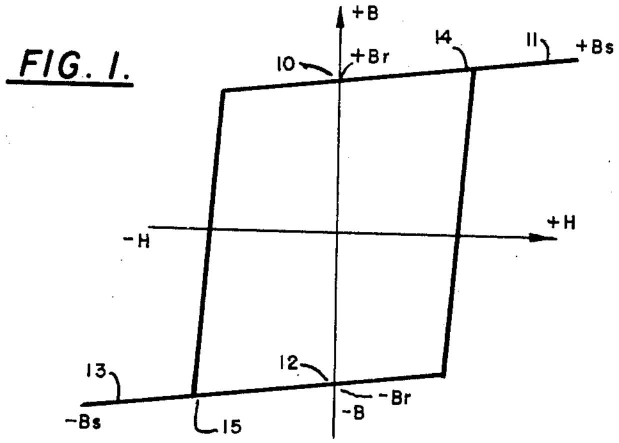
Figure 1 is an idealized hysteresis loop of a magnetic material which may preferably be employed in the cores of the magnetic amplifiers utilized in my invention.

Referring to Figure 1, the magnetic amplifiers of my invention preferably utilize magnetic cores exhibiting a substantially rectangular hysteresis loop. Such cores may be made of a variety of material, among which are various types of ferrites and various kinds of magnetic tapes, including Orthonik and 4–79 Molypermalloy.

These materials may have different heat treatments to give them different desired properties. In addition to the wide variety of materials applicable, the cores of the magnetic amplifiers to be discussed may be constructed in a number of different geometries including both closed and open paths. For example, cup-shaped cores, strips of material, or toroidal cores are possible. It must be emphasized that the present invention is not limited to any specific geometries of its cores nor to any specific materials therefor, and the examples to be given are illustrative only. In the following description bar type cores have been untilized for ease of representation and for facility in showing winding directions. Further, although the following description refers to the use of materials having hysteresis loops substantially as shown in Figure 1, this again is done merely for ease of discussion; and other forms of hysteresis loops may in fact be utilized. Thus, neither the precise core configuration nor core material to be discussed is mandatory and many variations will readily suggest themselves to those skilled in the art.

Returning now to the hysteresis loop shown in Figure 1, it will be noted that the curve exhibits several significant points of operation, namely, point 10 (+B*r*) which represents plus remanence; the point 11 (+B*s*) which represents plus saturation; the point 12 (−B*r*) which represents minus remanence; and the point 13 which represents minus saturation (−B*s*); and the points 14 and 15 which represent respectively the beginning of the regions of plus and minus saturation flux density.

Discussing for the moment the operation of a device utilizing a core which exhibits a hysteresis loop such as is shown in Figure 1, let us assume that a coil is wound on the said core. If we should initially assume that the core is at an operating point 10 (plus remanence), and if a current should be passed through the coil on the said core in a direction such as to produce a magnetizing force in a direction of +H, that is in a direction tending to increase the flux in the said core in the same direction, the core will tend to be driven from point 10 (+B*r*) to point 11 (+B*s*). During this state of operation there is relatively little flux change in the said core and the coil therefore presents a relatively low impedance whereby energy fed to the said coil during this state of operation will pass readily therethrough and may be utilized to effect a usable output. On the other hand, if the core should somehow be "flipped" from point 10 (+B*r*) to point 12 (−B*r*), prior to the application of a +H pulse, upon application of such a pulse the core will tend to be driven from the said point 12 (−B*r*) to the point 14. During this particular state of operation, there is a very large flux change in the said core and the coil therefore presents a relatively high impedance to the applied pulse. As a result, substantially all of the energy applied to the coil, when the core is initially at −B*r*, will be expended in flipping the core from point 12 to the beginning of the region of plus saturation, point 14, providing the size of the said +H pulse is properly chosen, with very little of this energy actually passing through the said coil to give a usable output. Thus, depending upon whether the core is initially at point 10 (+B*r*) or at point 12 (−B*r*), an applied pulse in the +H direction will be presented respectively with either a low impedance or a high impedance and will effect either a relatively large output or a relatively small output. These considerations are of great value in the construction of basic magnetic amplifiers.

Figure 2:
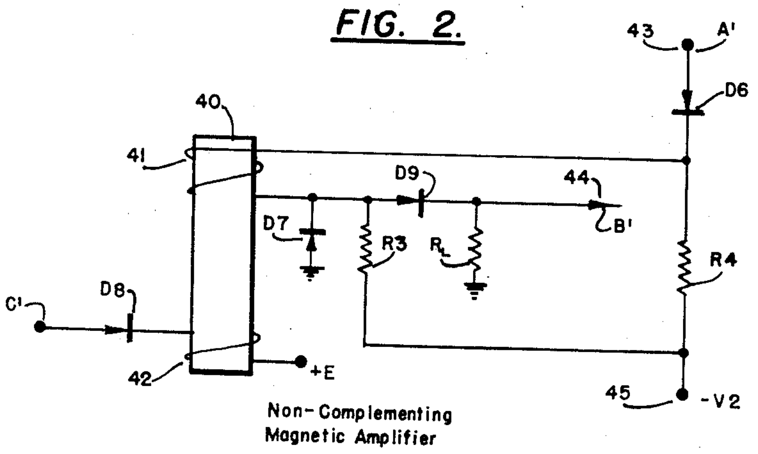
Figure 2 is a schematic representation of a basic non-complementing amplifier of the magnetic type.
Figure 3:
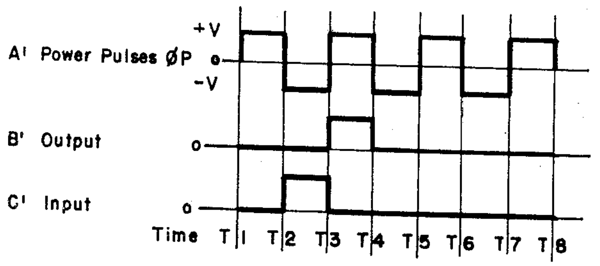
Figure 3 is a waveform diagram illustrating the operation of the non-complementing magnetic amplifier shown in Figure 2.

Discussing the basic operation of the device shown in Figure 2, it will be seen that a non-complementing magnetic amplifier in accordance with the present invention utilizes a magnetic core 40, preferably exhibiting a hysteresis loop substantially the same as that shown in Figure 1. This core 40 carries two windings thereon, namely, a power winding 41 and a signal input winding 42. Assuming now that the device is initially at the −B*r* point seen in Figure 1, application of a positive going power pulse during the time *t1* to *t2* at power input terminal 43 will cause a current to flow through the diode D6 and winding 41. Inasmuch as the power pulse energy is for the most part expended in flipping the core from −B*r* to +B*r*, only a sneak output, if any, will be present at output terminal 44 and this sneak output is effectively suppressed by the combination of resistor R3 and diode D7. It is to be noted that when the core 40 is at the minus remanence point 12 prior to the application of a pulse, for the no-output state of the device of Figure 2, the said positive going pulse, in flipping the core from minus remanence point 12 to plus remanence point 10, will cause a small current to flow through coil 41 and a small output to appear at the terminal 44, unless the current is suppressed. This small output is termed a "sneak output" and should preferably be suppressed. The resistor R3 and diode D7 effect such suppression. For this purpose the resistor R3 is so chosen that the current which flows from ground through diode D7 and through resistor R3, to a source of potential $-V_2$ at 45, has a magnitude equal to or greater than that of the sneak pulse current to be suppressed. As a result, only outputs substantially larger than the sneak output may appear at output terminal 44. Thus, the core initially having been at the minus remanence point, no output pulse appears during the time *t1* to *t2* due to the application of a positive going power pulse.

Assuming for the moment that no input pulse was applied to the anode of diode D8 during the time *t2* to *t3*, the negative going portion of the power pulse during this time period would cause diode D6 to be cut off. As a result a reverse current will flow from ground through diode D7, through the said winding 41, thence through resistor R4, to terminal 45 which is connected to a source of negative voltage $-V_2$. Resistor R4 is so chosen that this reverse current flow is sufficient to flip the core from the +B*r* point back to the −B*r* point during the *t2* to *t3* time period. The next positive going power pulse during the time *t3* to *t4* will therefore once more be expended in merely flipping the core, and again no usable output will be obtained. If now an input pulse should be applied during the time *t2* to *t3*, coincident with the application of a negative going portion of a power pulse applied at terminal 43, this input pulse will pass current through the diode D8 and through coil 42 whereby a magnetomotive force equal to and in opposition to that produced by the said reverse current flow through coil 41 during this same period will be established. Thus, the application of an input pulse during the time *t2* to *t3* will effectively neutralize any magnetizing tendency of the reverse current flow through coil 41, and the core 40 will not therefore be flipped to the minus remanence point during this time period. As a result the next positive going power pulse applied at terminal 43 during the time *t3* to *t4* will drive the core from plus remanence to plus saturation and will give a useable output at the terminal 44. If no input pulse is present during the time *t4* to *t5*, the reverse current flow through coil 41 during this time again flips the core to the minus remanence point whereby again there will be no output during the time *t5* to *t6*. As will be seen therefore the circuit of Figure 2 is in effect a non-complementing type of magnetic amplifier and no usable output will be obtained during a positive going portion of a power pulse unless an input pulse was present during the negative going portion of a power pulse immediately preceding it. The foregoing circuits readily lend themselves to the construction of bistable devices in accordance with the present invention.

Only one additional consideration should be noted in respect to the disposition of components shown in the circuit of Figure 2, and that is that in order to protect the input circuit (connected to the diode D8 to be discussed) against any interference from current flowing in the output winding 41, the signal winding 42 is returned to a positive voltage +E which is equal and opposite in value to the voltage induced or generated in it by current flowing in the power winding 41 when reverse current flows through the said winding 41.

Figure 4:
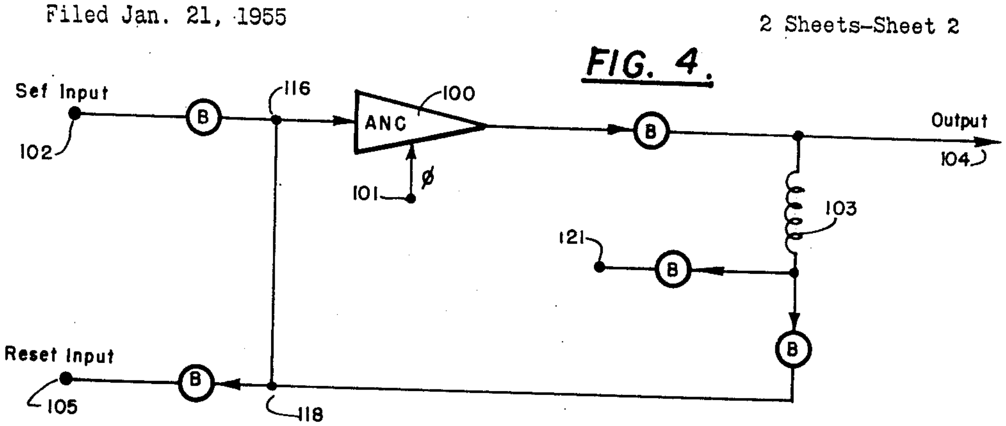
Figure 4 is a logical diagram of one form of the invention.
Figure 5:
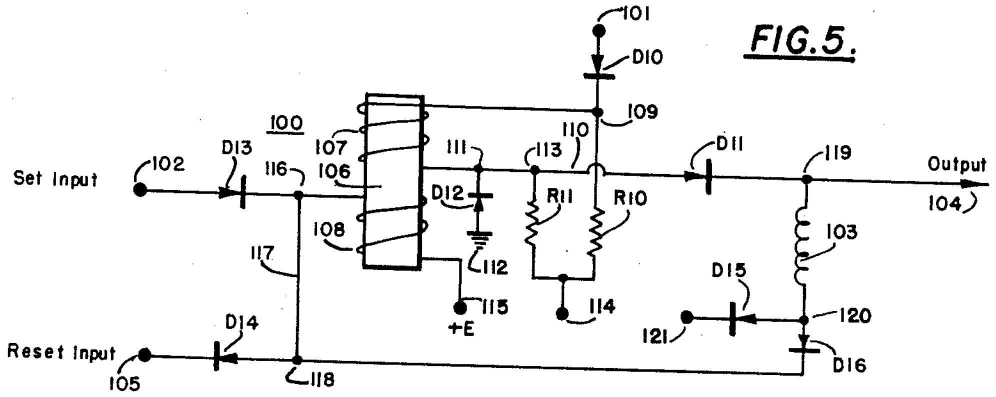
Figure 5 is one form of circuit diagram according to the invention as embodied in Figure 4.

Figure 4 is a logical diagram of a single core flip-flop device with inductive delay according to the invention. A non-complementing magnetic amplifier 100 is supplied with power pulses at terminal 101 and has a set input at terminal 102. The output of amplifier 100 is supplied to an inductor 103 which is a delay means supplied with a source of blocking pulses and connected to the input of amplifier 100. The application of a set input pulse to terminal 102 produces an output which appears at output terminal 104 and is also supplied to delay inductor 103. The inductive reaction of inductor 103 produces a positive voltage and a current in the signal winding of amplifier 100 in the proper direction to produce another output during the next power pulse, so that non-complementing magnetic amplifier 100 will continue to produce outputs which will appear at output terminal 104. This mode of operation of the flip-flop device provides a train of pulses at output 104 indicating that the last input signal to the device was applied to set terminal 102.

If a reset input pulse is now applied at reset terminal 105 the delayed pulse from inductor 103 is not able to produce a sufficient current to reset the core of amplifier 100 and no output will be produced in the followed period. The continued absence of positive potential at output terminal 104 indicates that the last input to the device was applied at reset terminal 105 and the flip-flop device is in its second stable state.

The circuit of Figure 7 comprises a non-complementing magnetic amplifier 100 having a core 106 of suitable ferromagnetic material, with a power winding 107 and a signal winding 108 thereon. Power winding 107 has one terminal connected to junction 109 with the cathode of diode D10 and one terminal of resistor R10. The anode of diode D10 is connected to a source of power pulses by terminal 101. The other terminal of power winding 107 is connected by wire 110 to the anode of diode D11. Wire 110 has a first junction 111 connected to the cathode of diode D12, the anode of which is grounded at 112. Wire 110 has a second junction 113 connected to one terminal of resistor R11. Resistors R10 and R11 are both connected to a source of negative potential −V, at terminal 114.

Signal winding 108 has one terminal connected to a source of positive potential +E, at terminal 115 and the other terminal connected to junction 116 with feedback wire 117. A diode D13 has its cathode connected to junction 116 and its anode connected to set input terminal 102. A diode D14 has its anode connected to junction 118 with wire 117 and its cathode connected to reset input terminal 105.

The cathode of diode D11 is connected to junction 119 with one terminal of delay inductor 103 and output terminal 104. The other terminal of inductor 103 is connected to junction 120 with the anodes of diodes D15 and D16, the cathodes of which are connected to a source of blocking pulses at terminal 121 and to feedback wire 117 respectively.

Non-complementing magnetic amplifier 100 comprises ferromagnetic core 106, power winding 107, signal winding 108, diodes D10, D12 and D13, resistors R10 and R11 and a supply of power pulses of suitable phase and amplitude at 101. This amplifier functions as described above. The power pulse supply is shown at curve A of Figure 6 as having an amplitude of +2E at the time *t1*. Suppose a set input pulse is applied during time *t2*—*t3*, then when the power pulse goes positive during the next half cycle, *t3*—*t4*, an output pulse will appear at the anode of diode D11 and output terminal 104. This output pulse produces a current in storage inductor 103. During this output interval *t3*—*t4*, the cathode of diode D15 is held at ground potential by a blocking pulse at terminal 121 whereby amplifier output current flows via inductor 103 and diode D15 to ground. At the end of the power pulse, instant *t4*, the potential of the anode of diode D11 drops to ground level and the cathode of diode D15 is raised to +2E by the blocking pulse at terminal 121 during the interval *t4*—*t5*, thereby to disconnect diode D15. The inductive reaction in inductor 103 is thus caused to produce a positive voltage at the anode of diode D16 in response to the aforementioned output current flowing through inductor 103, and this inductive "kick" effects a further control current via diode D16 to amplifier signal winding 108. The application of a next positive power pulse, for instance during interval *t5*—*t6*, thus produces a second output pulse in response to the previous inductive pulse input to the said amplifier, and this second output pulse in turn effects current flow in inductor 103, and a later inductive "kick" from the said inductor, whereby the amplifier 100 continues to produce outputs. This represents one stable state of the device and indicates that the last input pulse was applied to set terminal 102.

Figure 6:
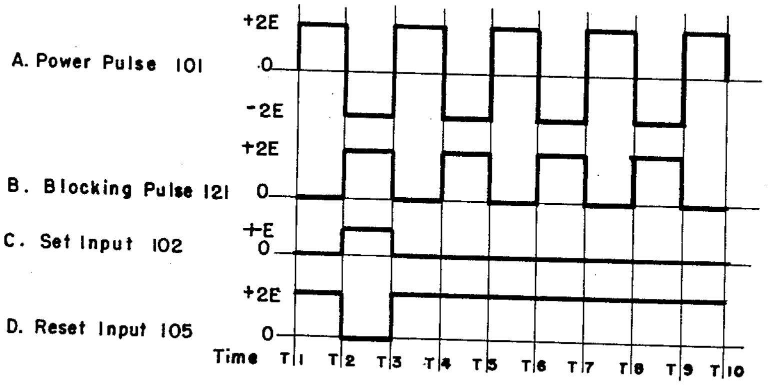
Figure 6 is a waveform diagram corresponding to one sequence of operation of the circuit of Figure 5.

If now a reset input pulse is applied at terminal 105, as shown in curve D of Figure 6, the pulse fed back by wire 117 from inductor 103 will be unable to raise the potential of the anode of diode D14 above ground level. Junction 118 may therefore be regarded as grounded during this interval and the fed back pulse will not be able to produce an effective current in signal winding 108. As there is therefore no input signal to non-complementing magnetic amplifier 100, there will be no output during the succeeding interval and this absence of potential at terminal 104 will continue until a suitable signal is applied to set input terminal 102. This absence of potential at terminal 104 indicates that the last input signal to the device was applied at terminal 105 and represents the second stable state of the device as a flip-flop.

While I have described above what are at present believed to be the preferred forms of my invention, it will be understood that various changes may be made therein by those skilled in the art without departing from the spirit of the invention. All such variations which fall within the true spirit of the invention are intended to be included in the appended claims in which generic terms have been employed to include all such variations and equivalent structures.

I claim:

1. In a single core flip-flop device having inductive delay, a single magnetic amplifier having an input and an output, feedback means comprising an inductor connecting said output to said input, and means for periodically changing the potential at one end of said inductor, whereby the inductive reaction of said inductor effects an inductive pulse when said amplifier is in an output producing state, said inductive pulse being coupled via said feedback means to said amplifier input.

2. The combination set forth in claim 1 wherein said amplifier comprises a non-complementing magnetic amplifier.

3. In a bistable device, a magnetic amplifier having an input and an output, a feedback circuit connecting said output and said input and comprising an inductor and a source of spaced blocking pulses connected to said inductor whereby said inductor produces an inductive pulse when said amplifier is in an output producing state, said inductive pulse being coupled to said amplifier input via said feedback circuit, and means for selectively preventing passage of said inductive pulse via said feedback circuit to said amplifier input.

4. The combination set forth in claim 3 wherein said amplifier comprises a non-complementing magnetic amplifier, said device having a plurality of input terminals.

5. In combination a pulse type magnetic amplifier having an input and an output, an inductor coupled at one of its ends to said amplifier output whereby said amplifier selectively effects current flow in said inductor, means for abruptly changing the potential across said inductor whereby the inductive reaction of said inductor produces a pulse when said amplifier is in an output producing state, and means coupling said pulse to the input of said amplifier thereby to control the output state of said amplifier.

6. The combination of claim 5 including control means connected to said pulse coupling means for selectively inhibiting passage of said inductive pulse to said amplifier input.

7. In a bistable device, a pulse-type amplifier having an input and an output, an inductor having one end thereof coupled to said amplifier output and the other end thereof coupled to said amplifier input, first signal means coupled to said amplifier input for selectively controlling the output state of said amplifier, means coupled to said inductor for effecting an inductive pulse across said inductor in response to an output from said amplifier, said inductive pulse being coupled to said amplifier input, and second signal means for selectively inhibiting the coupling of said inductive pulse to said amplifier input.

8. The combination of claim 7 wherein said amplifier comprises a non-complementing magnetic amplifier.

9. The combination of claim 7 wherein said second signal means comprises means selectively grounding said amplifier input.

10. In a control circuit, a non-complementing amplifier, means coupling signals to the input of said amplifier thereby to effect an output from said amplifier, an inductor coupled to the output of said amplifier, means operable subsequent to the commencement of an output from said amplifier for effecting an inductive reaction pulse in said inductor in response to occurrence of said amplifier output, and means coupling said inductive reaction pulse to the input of said amplifier.

11. The circuit of claim 10 including means for selectively inhibiting the coupling of said inductive reaction pulse to said amplifier input.

12. In a control circuit, an amplifier having an input and an output, signal means coupled to said input for controlling the output state of said amplifier, an inductor coupled at one of its ends to said amplifier output, a variable potential source coupled to the other end of said inductor for selectively changing the potential across said inductor subsequent to commencement of an output from said amplifier whereby the inductive reaction of said inductor effects an inductive pulse, and means coupling said inductive pulse to said amplifier input.

13. The circuit of claim 12 wherein said amplifier produces a pulse type output, said variable potential source comprising a source of blocking pulses, and a rectifier coupled between said blocking pulse source and the said other end of said inductor, said blocking pulse source having a first potential level upon commencement of an amplifier output whereby current may flow from said amplifier output via said inductor and thence via said rectifier to said blocking pulse source, and said blocking pulse source having a second potential level substantially coincident with termination of said amplifier output pulse for disconnecting said rectifier.

14. A bistable device comprising a magnetic amplifier having an input and an output, said magnetic amplifier comprising a magnetic core having two stable states of magnetic saturation and a coil adjacent said core, means for energizing said coil for repeatedly driving said core from one of said stables states to the other of said stable states without producing an output signal at said output, means connected to said input for temporarily interrupting the effect of said energizing means to produce an output signal at said output, and a feedback path from said output to said input for feeding back at least a portion of said output signal to perpetuate the extant condition of said device, said feedback path incorporating at least an inductor, said inductor having a substantially unchanging value of inductance within the operating range of said device.

References Cited in the file of this patent

UNITED STATES PATENTS 2,709,798 Steagall ______________ May 31, 1955